(12) United States Patent
Sorenson et al.

(10) Patent No.: US 7,926,797 B2
(45) Date of Patent: Apr. 19, 2011

(54) CABLE SPLINT

(75) Inventors: Larry Sorenson, New Prague, MN (US); Scott Carlson, Bloomington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 589 days.

(21) Appl. No.: 11/975,370

(22) Filed: Oct. 17, 2007

(65) Prior Publication Data

US 2009/0100674 A1    Apr. 23, 2009

(51) Int. Cl.
*B25B 1/20*    (2006.01)

(52) U.S. Cl. .......... 269/45; 269/228; 269/138; 269/139; 269/903

(58) Field of Classification Search ............ 269/45, 269/228, 201, 291, 71, 138, 139, 903
See application file for complete search history.

(56) References Cited

U.S. PATENT DOCUMENTS

| | | | | |
|---|---|---|---|---|
| 3,872,760 | A * | 3/1975 | Desnoyers, Jr. | 83/743 |
| 6,113,088 | A * | 9/2000 | Gakhar et al. | 269/139 |
| 6,116,588 | A * | 9/2000 | Yamane | 269/228 |
| 6,158,729 | A * | 12/2000 | Tsai | 269/228 |
| 6,364,302 | B2 * | 4/2002 | Ausilio | 269/32 |
| 6,412,158 | B1 * | 7/2002 | Moore | 29/249 |
| 7,144,003 | B1 * | 12/2006 | Meade | 269/43 |
| 2006/0233509 | A1 * | 10/2006 | Ray et al. | 385/136 |
| 2009/0100674 | A1 * | 4/2009 | Sorenson et al. | 29/869 |

FOREIGN PATENT DOCUMENTS

| | | |
|---|---|---|
| DE | 3428274 A1 | 1/1986 |
| EP | 0 147 162 A2 | 7/1985 |
| EP | 0 358 214 A2 | 3/1990 |
| EP | 0 803 753 A1 | 10/1997 |
| WO | WO 2004/040347 A1 | 5/2004 |

OTHER PUBLICATIONS

International Search Report and Written Opinion mailed Jun. 5, 2009.

* cited by examiner

*Primary Examiner* — Lee D Wilson
(74) *Attorney, Agent, or Firm* — Merchant & Gould P.C.

(57) ABSTRACT

A device used to secure a section of cable while one or more fiber is broken out from the cable. The device includes spaced apart clamp assemblies that hold a cable during the splicing process to protect the fairly delicate fibers within the sheathing. The disclosure also relates to a method of splicing using a clamp assembly.

14 Claims, 7 Drawing Sheets

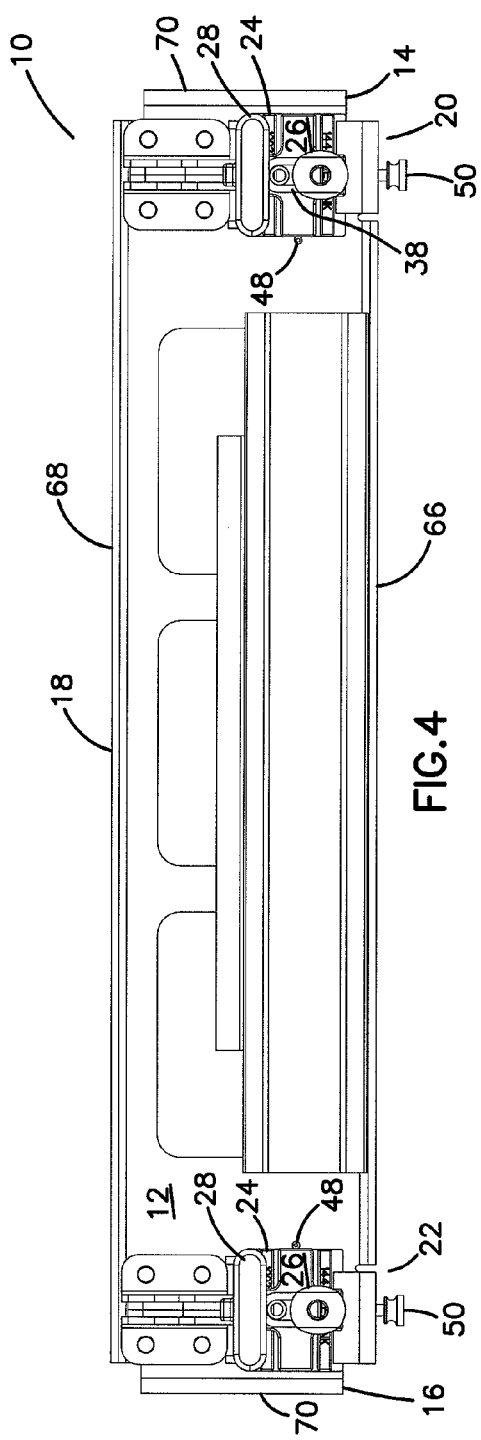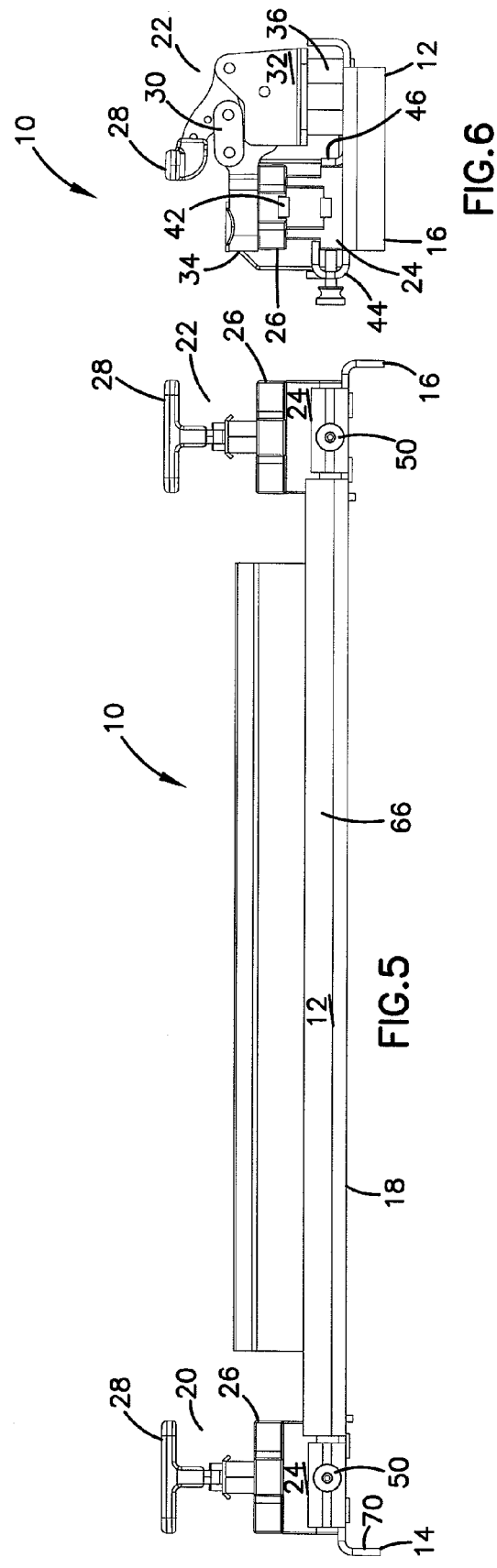

CABLE SPLINT

TECHNICAL FIELD

A device and method used to hold a section of cable while the content within the cable is accessed.

BACKGROUND

Fiber distribution cables are commonly used to connect a central office or hub to a number of end subscribers. A typical fiber distribution cable houses a large number of separate fibers, which are broken out along the length of the cable and connected to the end subscribers via secondary cables (e.g., drop cables, stub cables, etc.).

The individual or group of fibers can be broken out from the distribution cables in the field or before the cable leaves the factory. The present invention provides a device and method for breaking out fibers from a main distribution cable.

SUMMARY

The present disclosure relates to a cable holder. The cable holder can be used when splicing a main fiber distribution cable. In particular, the cable holder can be used to secure a section of cable while the outer protective sheathing is cut and select fibers therein are accessed. In some embodiments, select fibers are pulled out of the main cable to create pigtails, which connect to secondary cables (e.g., drop cables, stub cables). In such embodiments, it is desirable to overmold the splice area to protect it from being damaged in the field. The cable holder can be used to safely transport the cable from work station to work station during cable processing. The cable holder can also serves as a jig or fixture during the overmolding process. In such embodiments, the cable holder holds the section of cable in a fixed orientation and protects the section of cable from being damaged or contaminated during the overmolding process.

BRIEF DESCRIPTION OF THE DRAWINGS

FIG. 4 is a top view of the cable holder of FIG. 1;

FIG. 5 is a front view of the cable holder of FIG. 1;

FIG. 6 is an end view of the cable holder of FIG. 1;

DETAILED DESCRIPTION

Figure 1:
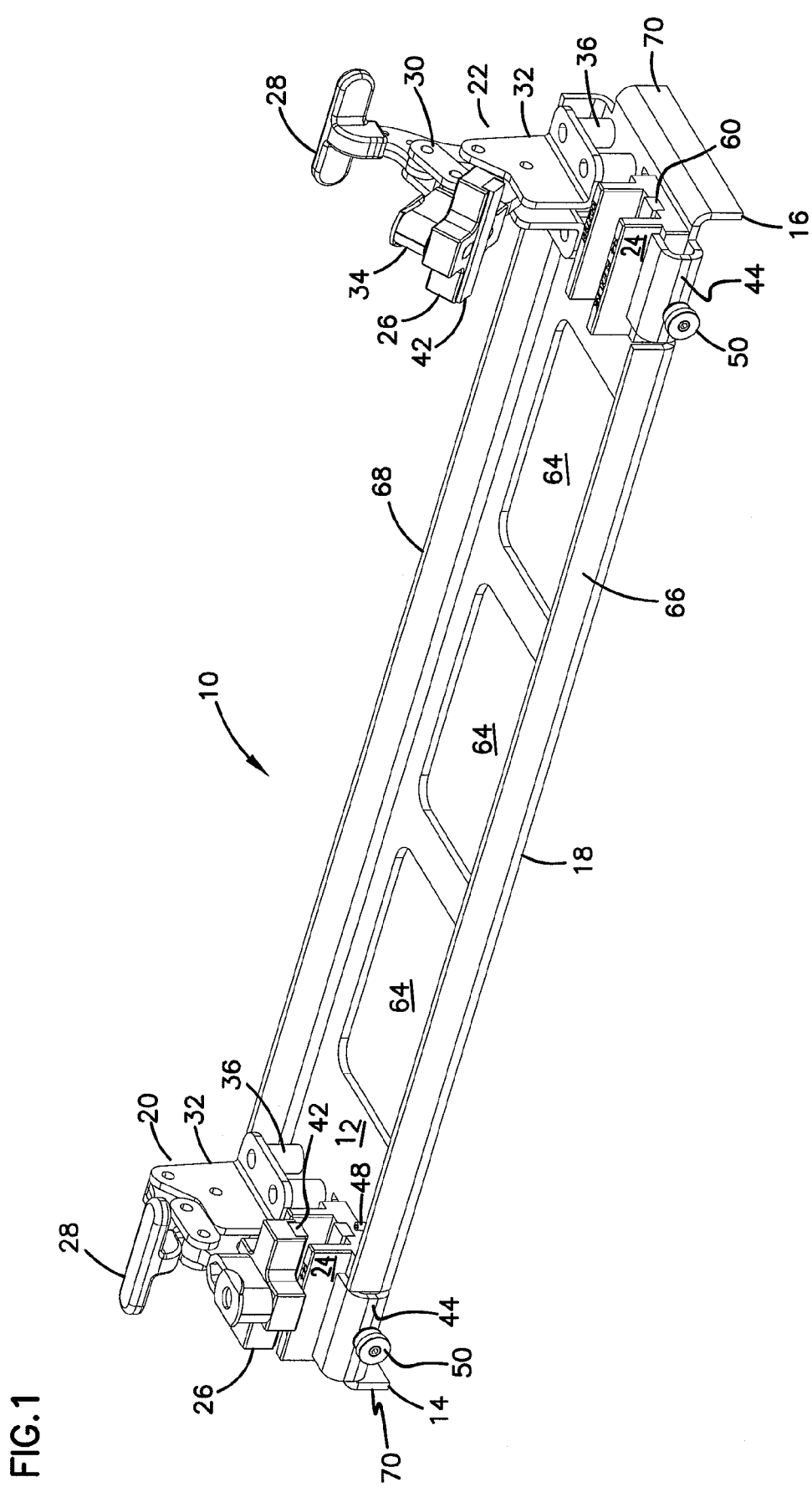
FIG. 1 is a perspective view of a cable holder according to a first embodiment of the present disclosure.

The cable holders according to the present disclosure are configured to secure a section of cable, for example, while the protective sheathing of a cable is cut and select fibers therein are accessed, while the section of cable is transported from one location to another, and/or during an overmolding process. The cable holders according to the present disclosure can be configured to hold a section of cable in a fixed orientation and protect it from being damaged (e.g., bent, bumped, contacted, or rotated) and/or contaminated. For example, during overmolding it is generally desirable to prevent the cable from bending and spinning.

Referring generally to FIGS. 1-6, a cable holder 10 according to a first embodiment of the present disclosure is shown. The cable holder 10 includes an elongated base plate 12 including a first end 14, an opposed second end 16, and a mid portion 18 therebetween. In the depicted embodiment, a first clamp assembly 20 is mounted to the first end 14, and a second clamp assembly 22 is mounted to the second end 16. Each clamp assembly includes a cable chuck 24 (also referred to herein interchangeably as an insert) configured to secure a section of cable 25 above the base plate 12.

The cable chucks 24 of each clamp assembly 20, 22 are aligned with each other to support a section of cable 25 in a parallel orientation relative to the elongated base plate 12. FIG. 1 depicts the second clamp assembly 22 in the disengaged or unlocked position, and the first clamp assembly 20 in the engaged or locked position. In the depicted embodiment each of the first and second clamp assemblies 20, 22 are identical. However, it should be appreciated that alternative embodiments of the cable holder 10 may include only one clamp assembly or multiple, different clamp assemblies.

Figure 2:
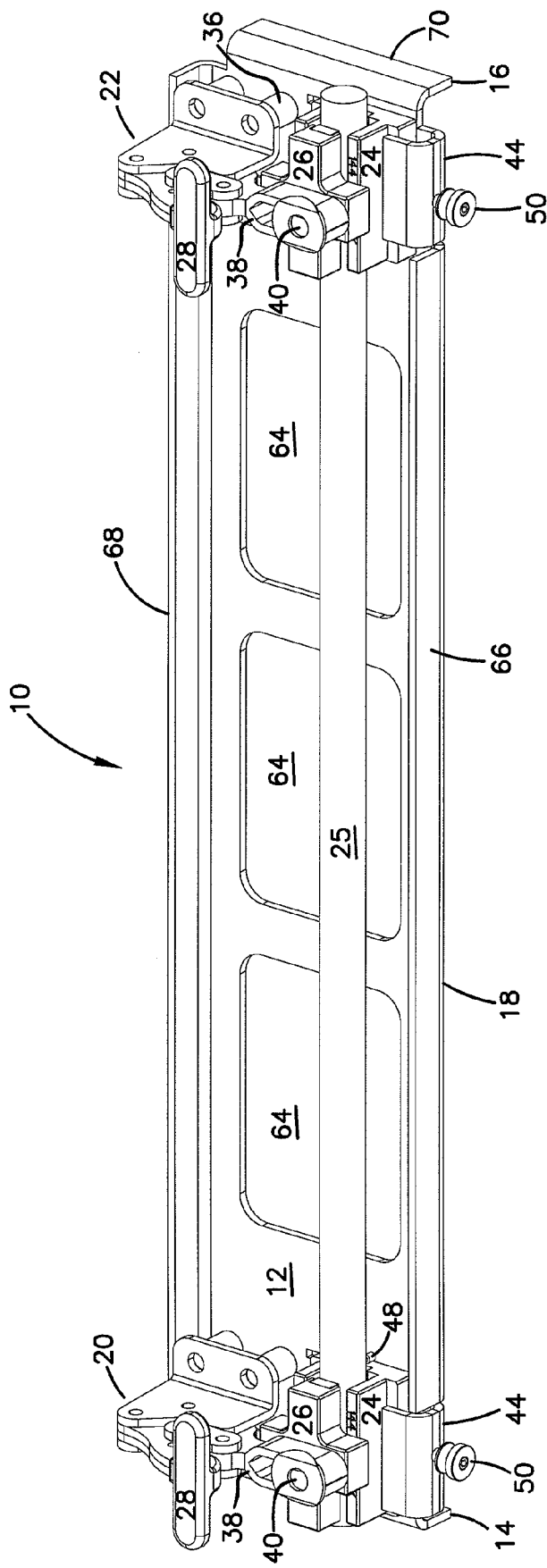
FIG. 2 is a perspective view of the cable holder of FIG. 1 with a section of cable held in the cable holder.

The clamp assemblies 20, 22 include an upper clamp portion and a lower clamp portion. In the depicted embodiment, the upper clamp portion consists of a four bar linkage bolted to the base plate 12, and the lower portion consists of a cable chuck 24 secured to the base plate 12. The upper portion of the clamp assembly is an over-center lock mechanism that includes a clamp pad 26 configured to press a section of cable 25 into the cable chuck 24. In the depicted embodiment, the four bar linkage clamp member includes a T-shaped handle 28 that is arranged relative to the connector bar 30, base bar 32, and extender 34 such that the upper clamp pad 26 locks in place when the T-shaped handle is in the downward or engaged position as shown in FIG. 2.

Referring to FIGS. 1-3, and 6, the upper portion of the clamp assembly 20, 22 is described in greater detail. In the depicted embodiment, the base bar 32 of the linkage is bolted to the base plate 12 via risers 36 and pivotally attached to the lower end of the handle 28 and the lower end of the extender bar 32. The connector bar 30 pivotally connects the handle 28 and the extender bar 34 above the lower ends and below the upper ends of the handle 28 and extender bar 34. The upper end of the extender bar 34 supports the clamp pad 26. In the depicted embodiment, the location of the clamp pad 26 relative to the extender bar 34 is adjustable. The extender bar 34 includes a slot 38 through which a bolt 40 extends to connect the clamp pad 26 to the extender bar 34 (see FIG. 2). In the depicted embodiment, the clamp pad 26 is X-shaped and includes a resilient material 42 (e.g., foam, rubber, plastic, etc.) on its bottom surface. The resilient material 42 is configured to engage the top surface of a section of cable 25.

Still referring to FIGS. 1-3, and 6, the lower portion of the clamp assembly 20, 22 is described in greater detail. The lower portion generally consists of the cable chuck 24 secured to the base plate 12. In the depicted embodiment, cable chuck 24 is configured to be interchanged depending on the diameter of the section of cable 25. In the depicted embodiment the cable chuck 24 is held to the base plate 12 via a pair of arms 44, 46 and a stopper 48. The pair of arms 44, 46, and stopper 48 allow the cable chuck to be easily engaged and disengaged from the base plate 12. In particular, they engage the base of the cable chuck and allow the cable chuck 24 to slide into engagement with the base plate 12. The front arm 44 includes a lock member 50 that interlocks with a groove 52 to secure the cable chuck in place. In some embodiments the lock member 50 is a threaded set screw, and in other embodiments it is a spring loaded boss member.

Figure 3:
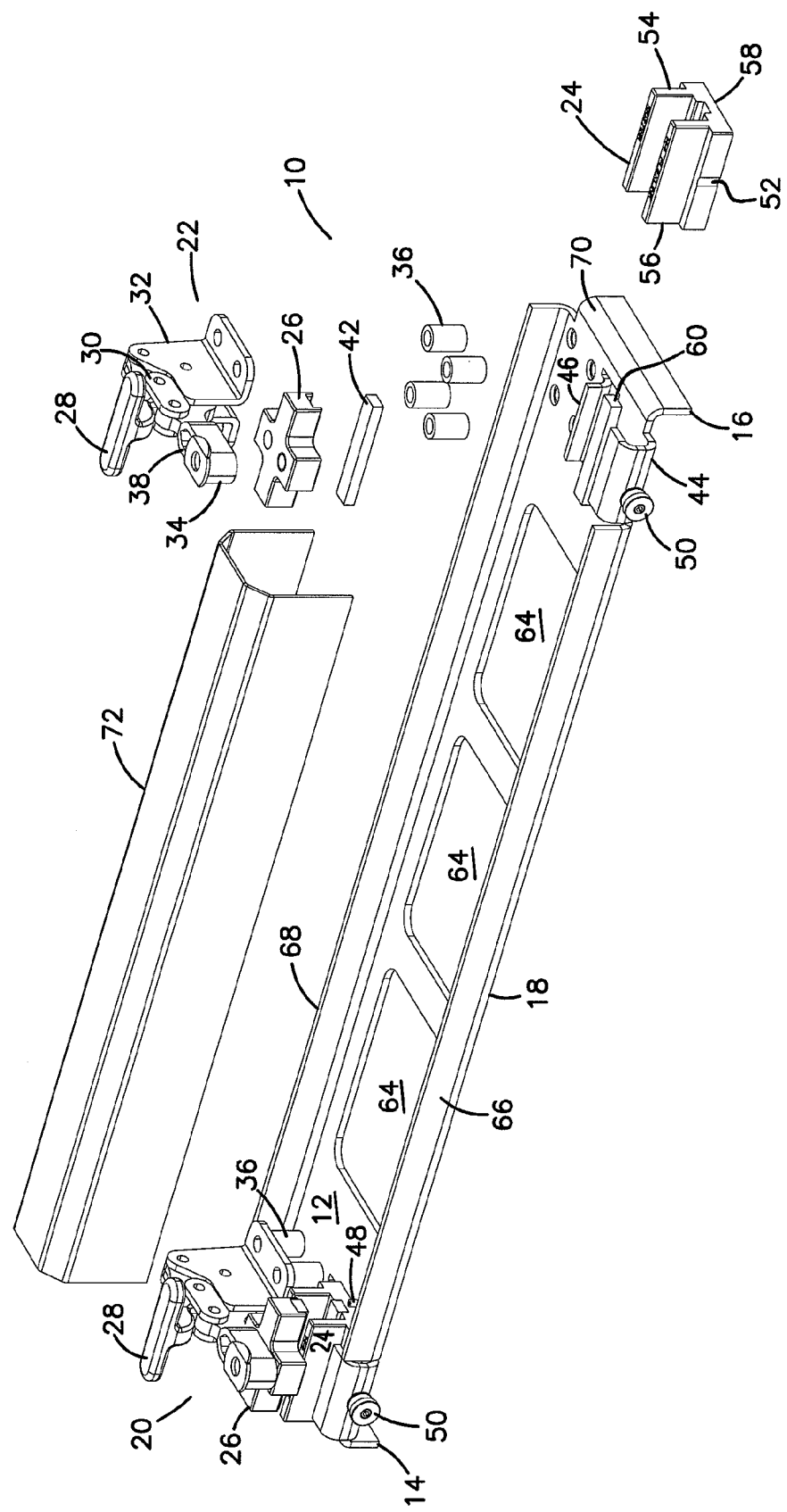
FIG. 3 is an assembly view of the cable holder of FIG. 1.

Referring to FIG. 3, the cable chuck 24 (insert) is described in greater detail. In the depicted embodiment the cable chuck 24 includes two opposed, generally parallel walls 52, 54 that extend from a base member 58. The walls 52, 54 are separated by a space that generally correlates with the diameter of the section of cable 25. In the depicted embodiment the base member 58 includes a resilient material 60 that is configured to support the bottom surface of the section of cable 25. In some embodiments the height of the walls 52, 54 is less than the distance between the resilient material 60 of the cable chuck 24 and the resilient material 42 of the clamp pad 26 when the clamp pad 26 is in the locked or engaged position.

Still referring to FIG. 3, the base plate 12 is described in greater detail. In the depicted embodiment the base plate 12 is generally rectangular in shape and includes a number of apertures 64 therein. The base plate also includes a front lip 66, a rear lip 68, and curved over end portions 70. Optionally, a hood or cover 72 is connected to the base plate 12. In some embodiments, the cover 72 is generally U-shaped and extends between the clamp assemblies 20, 22. In some cable finishing processes, the cable is coated with epoxy or silicon. During such processes it is generally desirable to protect the section of cable from contact and contamination.

Figure 7:
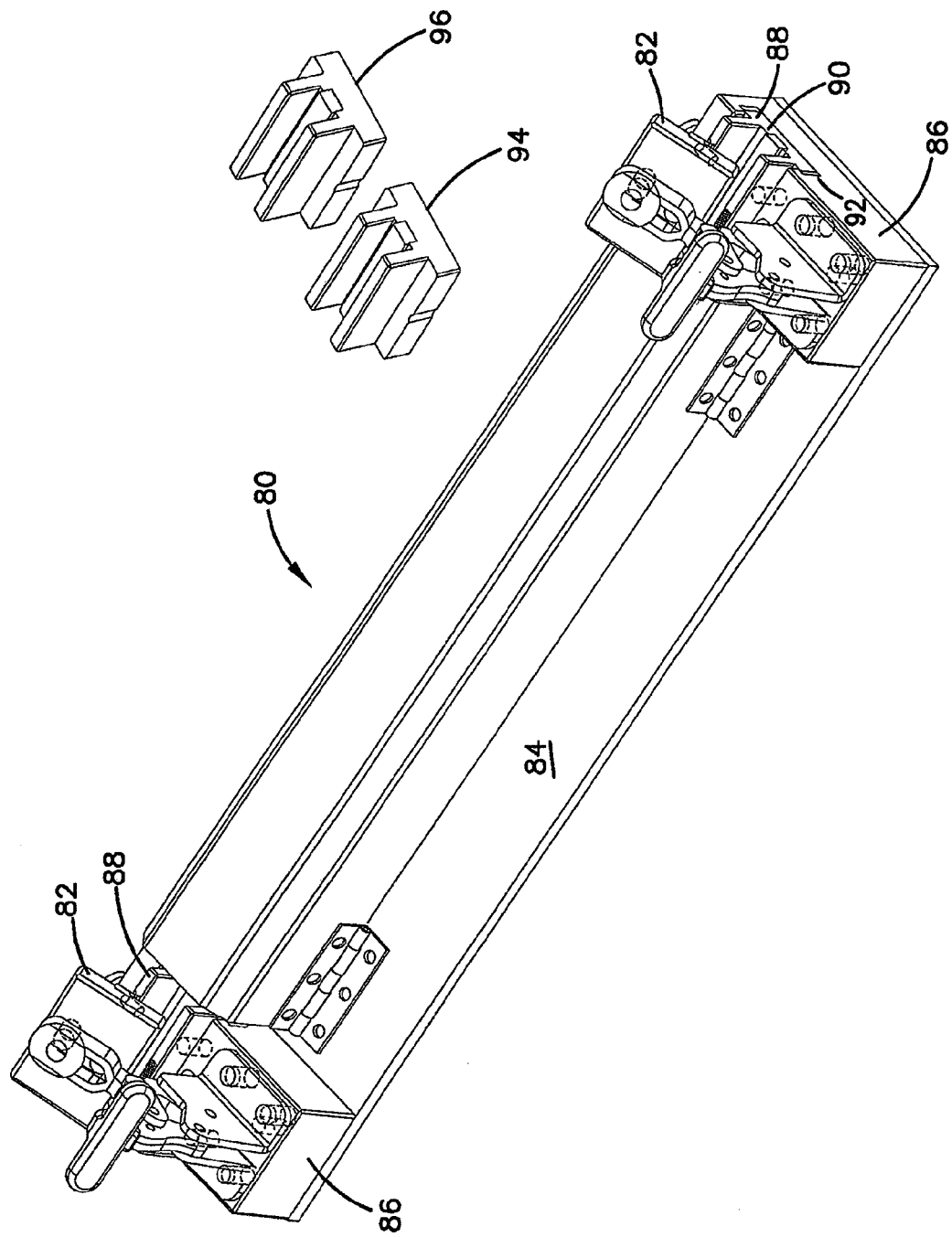
FIG. 7 is a perspective view of a cable holder according to a second embodiment of the present disclosure.
Figure 8:
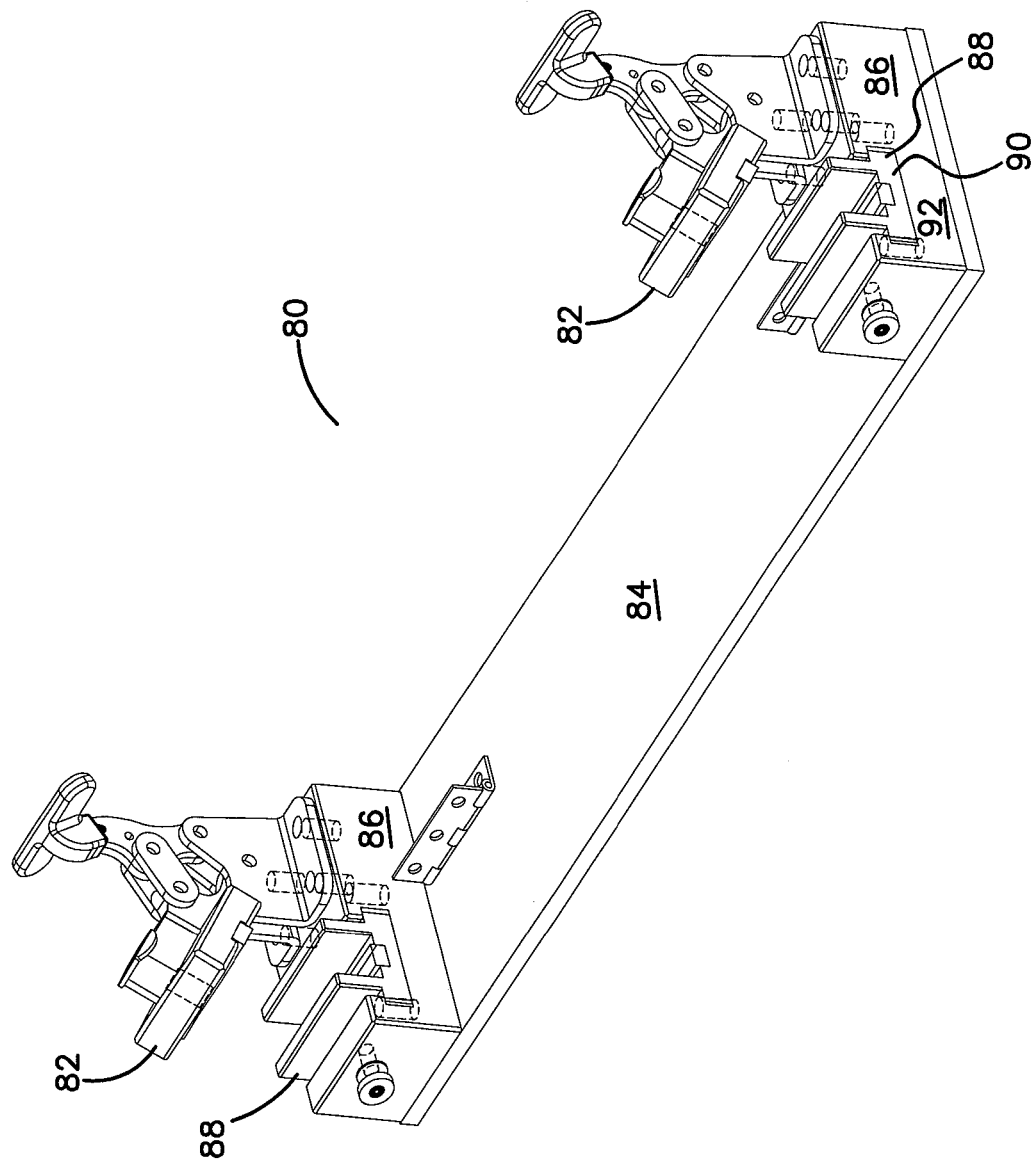
FIG. 8 is a perspective view of a partially disassembled cable holder of FIG. 7.
Figure 9:
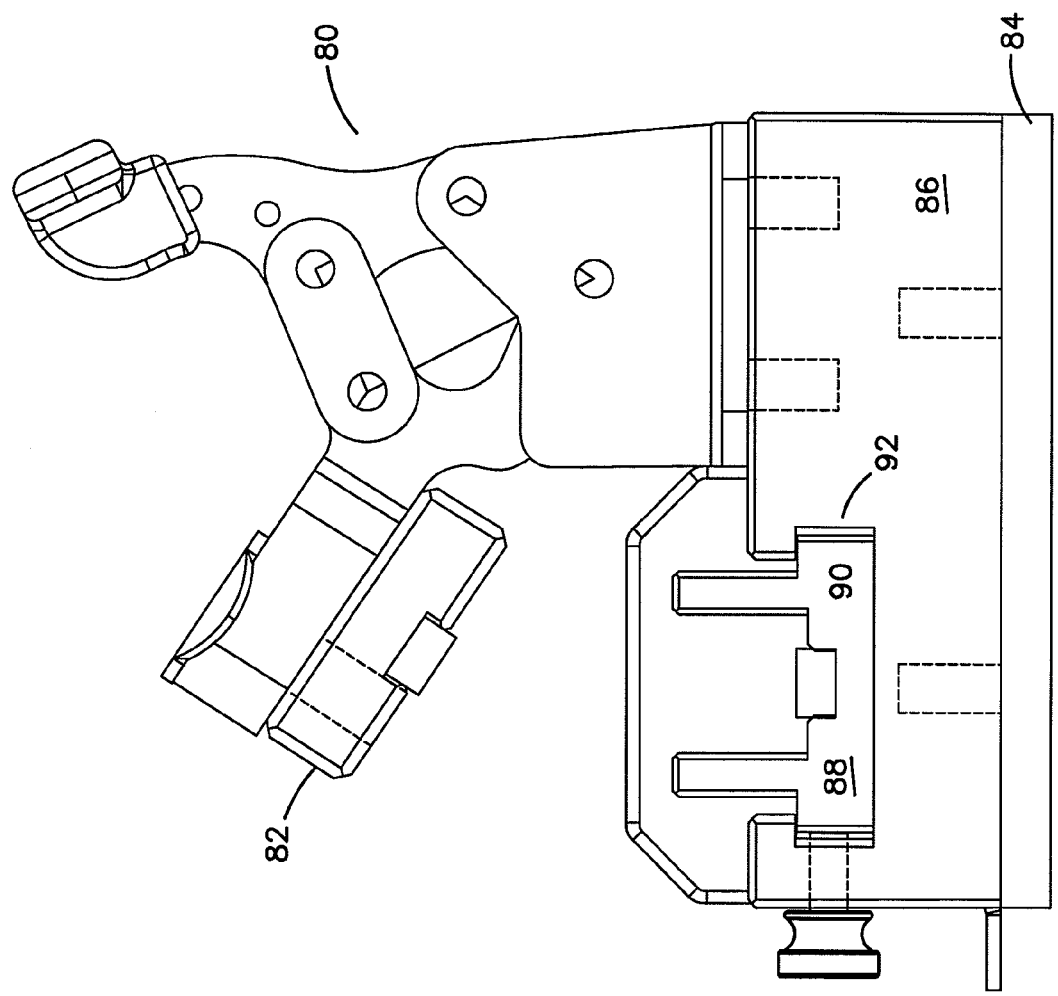
FIG. 9 is an end view of the cable holder of FIG. 7.

Referring to FIGS. 7-9, a second embodiment of the cable holder is shown. The cable holder 80 of the second embodiment is similar to the cable holder 10 of the first embodiment. Some differences relate to the shape of the clamp pads 82 and the shape of the base plate 84. Other differences relate to the manner in which the upper and lower clamp members are mounted to the base plate 84. The upper and lower clamp members of the cable holder 80 are mounted to the base plate 84 via mounting blocks 86. The mounting blocks eliminate the risers 36 shown in the first embodiment. In addition, the mounting blocks 86 provide an alternative quick release means for supporting the cable chuck 88. Instead of the boss and arms shown in the first embodiment, the base 90 of cable chuck 88 is engaged in channels 92 in the mounting block 86. FIG. 7 also depicts cable chuck 94 and cable chuck 96. Cable chucks 88, 94, 96 can be of different sizes and configurations. The appropriate cable chuck 88, 94, 96 can be selected to best fit the specific cable that will be used with the cable holder 80.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A cable holding assembly comprising:
   an elongated base including a first end and an opposed second end;
   a first clamp assembly mounted to the first end of the base;
   a second clamp assembly mounted to the second end of the base;
   wherein at least one of the first and second clamp assemblies includes:
      a cable chuck connected to the base plate, the cable chuck configured to engage the outer surface of a cable and support the cable above the base, wherein the cable chuck includes a first wall and an opposed second wall spaced apart on a chuck base member, wherein an upper opening configured to receive a segment of the cable is defined between the first wall and the second wall; and
      a clamp member configured to contact a portion of the segment of cable between the first wall and second wall and press the segment of the cable against the cable chuck in a direction towards the chuck base member.

2. The cable holding assembly of claim 1, wherein the cable chuck and the base are connected via a quick release mechanism.

3. The cable holding assembly of claim 2, wherein the quick release mechanism includes opposed arms that hold the chuck down on the base and prevent the chuck from sliding in a first direction, but allows the chuck to slide in a second direction perpendicular to the first direction.

4. The cable holding assembly of claim 1, wherein the cable chuck includes markings that correspond to the size of the cable chuck.

5. The cable holding assembly of claim 1, wherein the clamp member is X-shaped and includes a resilient pad extending in a direction generally parallel to the elongated base plate.

6. The cable holding assembly of claim 1, wherein the clamp assembly includes a four bar linkage bolted to the elongated base and the position of the clamp member is adjustable relative to the linkage.

7. The cable holding assembly of claim 1, further comprising a cover connected to the elongated base.

8. The cable holding assembly of claim 1, wherein the quick release mechanism includes channels in the base that slidably receive the cable chuck.

9. A cable holding assembly comprising:
   a base plate including a first end, a second end, and a mid portion between the first and second ends;
   a first clamp assembly mounted to the first end of the base plate;
   a second clamp assembly mounted to the second end of the base plate;
   a hinged cover pivotally mounted to the mid portion of the base plate;
   wherein each of the first and second clamp assemblies includes:
      a cable chuck including a first wall and an opposed second wall spaced apart on a chuck base member; and
      a clamp pad positioned above the cable chuck, the clamp pad being mechanically linked to a clamp arm such that the clamp pad extends over the first and second walls of the cable chuck when the clamp arm is in an engaged position.

10. The cable holding device of claim 9, wherein the first and second walls of the cable chuck in the first clamp assembly are aligned with the first and second walls of the cable chuck in the second clamp assembly.

11. The cable holding device of claim 9, wherein a top surface of the base member of the cable chuck is mounted above a top surface of the base plate.

12. The cable holding device of claim 9, wherein the base member of the cable chuck and the clamp pad each include a resilient material.

13. The cable holding device of claim 8, wherein the space between the first and second walls is greater than the distance between the resilient material on the base member and the resilient material on the cable chuck when the clamp is in the engaged position.

14. The cable holding device of claim 9, wherein the base member includes channels that slidably receive the chuck base member and a set screw that locks the cable chuck in place relative to the base member.

* * * * *

UNITED STATES PATENT AND TRADEMARK OFFICE
CERTIFICATE OF CORRECTION

| | |
|---|---|
| PATENT NO. | : 7,926,797 B2 |
| APPLICATION NO. | : 11/975370 |
| DATED | : April 19, 2011 |
| INVENTOR(S) | : Sorenson et al. |

It is certified that error appears in the above-identified patent and that said Letters Patent is hereby corrected as shown below:

Col. 4, line 54, claim 13: "claim 8," should read --claim 9,--

Signed and Sealed this
Sixth Day of December, 2011

David J. Kappos
*Director of the United States Patent and Trademark Office*